May 3, 1960

A. E. MIGNONE ET AL

RECORD SUSTAINING STRUCTURES AND METHODS FOR MANUFACTURING SAME

Filed Aug. 23, 1956

2,935,369

INVENTORS
ALBERT E. MIGNONE
ROBERT C. WELLS
BY Campbell, Brumbaugh, Free and Graves
THEIR ATTORNEYS United States Patent Office 2,935,369

Patented May 3, 1960

2,935,369

RECORD SUSTAINING STRUCTURES AND METHODS FOR MANUFACTURING SAME

Albert E. Mignone, Wellesley, and Robert C. Wells, Bedford, Mass., assignors to Arthur D. Little, Inc., Cambridge, Mass., a corporation of Massachusetts Application August 23, 1956, Serial No. 605,899

15 Claims. (Cl. 346—135)

This invention relates generally to structures having record sustaining layers through which a mechanical stylus may move to trace out a visible record of the stylus movement. More particularly, this invention relates to record receiving structures of the above character which are particularly suitable for use with a recording system which has a recording instrument providing only a small energy output to deflect the stylus and/or which has a motor means providing only a small energy output to move the record receiving structure so as to develop, say, a time base for the stylus trace.

Low energy recording systems of the type mentioned are highly advantageous, since, for example, the system in the recording of small value physical quantities may be operated directly by the quantity recorded, thus obviating the bulk, expense and other drawbacks inherent in the commonly necessary components interposed for amplifying purposes between the source of the quantity and that part of the system which produces the actual deflection of the stylus. Also, such low energy recording systems are of great advantage in that they eliminate the necessity for bulky, expensive and complex motor means for moving the record receiving structure during recording.

In order to achieve a low energy recording system of the type described, it is necessary that the record receiving structure itself have certain energy minimizing characteristics whose nature will be brought out by the following discussion.

Considering first the instrument which drives the stylus, and assuming that it is desired to obtain a record which can be read to a desired accuracy, as, say, 1% of full scale deflection, it is known (as taught, for example, in copending U.S. application, Serial No. 486,069 filed February 4, 1955 by Bernard Vonnegut, now Patent No. 2,897,038) that this instrument, in order to properly drive the stylus over the record receiver, must provide an energy output which equals ½ FD where F and D are, respectively, the force necessary to produce full-scale deflection of the stylus, and the distance traveled by the stylus tip from zero to full-scale deflection. The force F which is required varies as $f_s$, the drag force of the record receiving structure on the stylus. This drag force can be minimized by providing for the structure a record sustaining layer which is easily removable from its substrate by the stylus and is easily sheared by the stylus, and by providing a low coefficient of friction between the stylus and the substrate surface on which the stylus rides in the course of moving through the record sustaining layer.

To the end of reducing the stylus driving energy which is required, the distance, D, traveled by the stylus to full scale deflection, can be reduced down to the point where, in visually reading the trace, directly by eye or by use of a suitable optical magnifier, the reading error approaches and begins to exceed the mechanical displacement error caused by stylus drag and other loading forces on the stylus deflecting instrument. This reading error can, in turn, be reduced by reducing the width of the trace, and by making the trace more easily visible.

Consider, now, the motor means which moves the record receiving structure to develop a time base for the trace. At the maximum frequency at which the stylus is to be deflected, the speed S at which the motor means moves the structure under the stylus must be great enough to prevent substantial overlapping of the trace during successive swings of the stylus. Taking this factor into account, however, if the trace width can be reduced, the speed S can be commensurately reduced to thereby reduce the energy output required of the motor means.

From what has been said, it will be seen that both the amount of energy required to properly deflect the stylus and the amount of energy required to produce time base movement of the record receiving structure can be minimized by minimizing the width of the trace, and by maximizing the visibility of the trace. Minimization of the trace width and maximization of the trace visibility also have the advantage that the structure required to record the trace can be greatly reduced in size, or a number of traces can be recorded on a single structure of small size.

Record receiving structures designed to minimize the discussed energy requirements of recording have been disclosed in the aforementioned Vonnegut application.

These earlier record receiving structures are, however, limited in their ability to reduce the said energy requirements inasmuch as these earlier structures employ a carbon black layer as the most suitable record sustaining layer known at the time, and inasmuch as a carbon black layer has certain characteristics which result in a larger trace width and lesser trace visibility than is entirely desirable.

More specifically, it has been recently discovered that, in a carbon black layer, there seems to be a chain linkage between adjacent carbon particles, as strong or stronger than the adhesive force of the carbon black to the substrate surface. Therefore, when the stylus scrapes the layer from the substrate surface, some of the layer lying to one side of the path of the stylus tip is also removed. The substrate surface cannot hold this layer portion bordering the path of the stylus tip because the adhesive force of layer to the substrate surface is less than or at least no greater than the cohesive force between carbon particles. The resulting trace width is, then, appreciably greater than the tip of the stylus which makes the trace.

This characteristic of the carbon black layer leads to the following disadvantages. The readability of the trace varies as the optical density of the record sustaining layer. This is so, since as the optical density of the layer increases, the optical contrast will increase between the area from which the layer has been removed to form the trace, and the area on which the layer remains. Assume, as a first case, that an optical density value of 0.9, as measured by the Kodak densitometer is desired for better readability of the trace. At this optical density value, it has been found that the width of the trace formed in a carbon black layer cannot be reduced in value below 40 microns because of the said seeming tendency of the carbon black particles to cohere. If the lower limit of the trace width is fixed at a value of 40 microns, the lower limit to which the quantity D can be reduced is likewise fixed to a value which may demand greater energy outputs from the stylus driving instrument and/or from the time base motor means than are desirable for the intended application of the recording system.

As a second case, assume that one or both of the energy outputs provided by the stylus driving instrument or the time base motor means require that the trace width be no greater than 10 microns, but will be satisfied by a 10 micron value of trace width. In order to obtain this 10 micron value of trace width, it has been found that it is necessary to reduce the optical density of the carbon black layer to a value of 0.3. If, however, the optical density is lowered to 0.3, this 0.3 value may not be enough to give the degree of readability desired under the circumstances.

As a third case, assume that sufficient readability will be provided by a layer having an optical density of 0.3, but that the trace width must be less than 10 microns. A carbon black layer is unable to satisfy these conditions since it has been found that the minimum trace width obtainable from a carbon black layer of 0.3 density is a trace width having a value of 10 microns.

It is evident that any record trace must be interpreted by referring the trace to some datum as, say, an indicium in the form of a line representing positions of the trace which correspond to zero deflection of the stylus. Another such datum may be provided by, say, one or more indicia representing the amount of the time base movement of the record receiving structure relative to the stylus. When the record receiving structure used is of the type wherein a mechanical stylus traces out the record in a record sustaining layer, it has not been customary in the prior art to include, as part of the structure, one or more indicia of the sort described and for the purposes described.

It is accordingly an object of the invention to provide record receiving structures characterized by improved visibility of a trace of given width formed by a stylus in a particulate record sustaining layer.

Another object of the invention is to provide record receiving structures characterized by a record sustaining layer in which, for a given degree of visibility, a trace of reduced width may be formed.

Still another object of the invention is to provide record receiving structures having a record sustaining layer which provides both improved visibility of a trace formed therein and a reduced width of the said trace.

A further object of the invention is to provide record receiving structures adapted to record a full trace over a small face area of the structures.

A still further object of the invention is to provide record receiving structures wherein the drag force exerted on the stylus by the structure is minimized.

Another object of the invention is to provide methods for manufacturing record receiving structures of the character described.

Yet a further object of the invention is to provide record receiving structures which include at least one visible indicium which serves as a datum for reading a trace formed in a record sustaining layer on the structure by a mechanical stylus which passes through the layer.

These and other objects are realized according to the present invention by providing an underbody and by further providing a record sustaining layer carried by the underbody and comprised of a large number of fine, discrete metal particles having a mat appearance within the layer.

The underbody may consist of only a foundation member which furnishes the support for the structure and may be, say, a thickness of glass, or the underbody may consist of more than one thickness of material as, say, a foundation member of glass and an additional thickness of some plastic material such as nitrocellulose. Although the thickness of the underbody need not have any particular relation to the other dimensions thereof, it is convenient that the underbody be of sheet or plate form to provide a large-size face area in relation to its thickness. The outline of the face of the underbody may be of any desired shape as, for example, rectangular or circular, and the face of the underbody may be either curved or planar so long as the face is flat in the sense that it is substantially free of surface irregularities which would interfere with movement of a stylus over the face. Although the underbody may conveniently be made rigid, the member may also be flexible providing that, during recording, the underbody is prevented from sagging.

In respect to its optical character, the underbody may be conveniently made of a material which is pervious to light in order to permit the trace formed on the record sustaining layer to be read by transillumination of the member. However, the underbody or a layer thereof may also be light-reflecting to permit the said trace to be read by reflected light, or, in fact, may be of any optical characteristic which permits the trace formed in the record sustaining layer to stand out distinctly in the visible sense from the portions of the layer on which no trace is formed.

The record sustaining layer is produced by vaporizing a body of metal into an atmosphere of reduced pressure, and by deposition of the vaporized metal in the form of a great number of fine particles. These particles are "metal" particles in the sense that a gross chemical analysis of the record sustaining layer would show the layer to consist of a chemically uncombined metal which may or may not have a small percentage content of an impurity or impurities in the nature of metal reaction products with the atmosphere through which the particles are deposited, or reaction products of the atmosphere in which the record sustaining layer is stored. Suitable metals for the particles are, say, silver, gold, platinum, palladium, aluminum or copper. The "metal" particles referred to are to be distinguished from particles constituted of a nonmetallic substance such as carbon or from particles constituted primarily of a chemical compound as, say, a metallic salt of which one example is silver iodide.

The particles of the present invention are discrete particles in the sense that individual particles can be identified using high power microscopy. A record sustaining layer formed according to the present invention is thus to be distinguished from a metal layer wherein the layer structure is substantially continuous from molecule to molecule of the constitutent metal and wherein, accordingly, the layer structure is essentially a non-particle structure.

As another distinguishing characteristic of the particles of the present invention, although these particles may be formed of metal which would be reflecting in a "mirror" layer (i.e., a layer which, like the silver layer on the back of a mirror, has a continuous layer structure to provide specular reflection), the particles are small enough in size to cause multiple internal reflections of incident light within the layer to the extent that the layer and particles become substantially mat, i.e. nonreflective, in appearance. In this manner the layer and particles may appear to be as "dead black" as a layer of carbon black. A record sustaining layer according to the present invention is thus to be distinguished both from the non-particle metallic "mirror" layer hereinbefore referred to, and from a layer composed of metal particles so large in size that the layer is lustrous or scintillating in appearance as a result of light reflected out of the layer by the particles therein.

As a feature of the invention, there may be provided a record receiving structure which has a record sustaining layer in which a visible trace is formed by a mechanical stylus, and which also has at least one visible indicium in visibly superposed relation with the trace to permit the trace to be visually read with reference to the indicium, the indicium and trace being relatively disposed in a structural sense to be in the relation of underlay and overlay. In connection with this feature of the invention, the record sustaining layer may or may not be constituted of the described metal particles.

The indicium referred to may take the form of a "zero" mark representing the position of the trace which corresponds to zero deflection of the stylus, or the form of a time base mark representing an amount of time base movement of the record receiver relative to the stylus, or the form of a mark useful for some purpose other than these enumerated. More than one indicium may be present on the record receiver, and if a plurality of indicia are so present, the separate indicia may be conveniently disposed in a systematic array which will be referred to hereinafter as a "grid." Such grids may consist of indicia which are all of the same type or are of diverse type. Thus, a grid may consist, say, of all zero marks or lines or, say, of one or more zero marks or lines plus one or more time base or other marks.

The one or more indicia on the record receiver may be formed on the record receiver in any manner so long as they are visible in either the sense that they may be seen under ordinary conditions of illumination or in the sense that they may be seen under special conditions of illumination. Thus, the one or more indicia may be grooves or other recesses formed in the record receiver to become visible under the special condition of side illumination of the receiver. Conveniently, however, the one or more indicia may be such as to be visible by front illumination or by transillumination of the record receiver.

It is evident, if a trace is to be read with reference to one or more indicia, that the one or more indicia should be small enough in size and located precisely enough to allow such readings to be made with the maximum accuracy which the dimensional characteristics of the trace permit. In other words, the limit of reading accuracy should be determined by the trace rather than by an indicium which serves as a datum for reading the trace. In furtherance of this end, the one or more indicia may be formed on the record receiving structure by a photographic process. Such process has the advantage that very small size indicia may be produced on a member with high exactitude of location to permit traces of very small length and/or deflection to be accurately read. The photographically produced indicia are thus particularly suitable for use with a metal particle record sustaining layer in which traces of very small width may be formed. Other advantages of such photographic process are that the process lends itself to quantity production of record receiving structures whose indicia from one structure to another must be identical in size and relative location, and that the degree of contrast between the indicia and the areas surrounding the indicia can be controlled. Other advantages of the photographic process will be mentioned hereinafter.

The one or more indicia may be either on the opposite side of the foundation member from the record sustaining layer, or may be located between the foundation member and the layer. The latter arrangement is preferable since it reduces optical parallax. In many applications it is desirable that the one or more indicia be covered by a protective coating which is pervious to light to permit the one or more indicia to be seen through the coating. Such protective coating is particularly desirable, when the one or more indicia are photographic images, to assure that the image forming material will not become dislodged from its substrate. Also, if the one or more indicia are on the same side of the foundation member as the record sustaining layer, the protective coating will be interposed between the indicia and the layer to prevent the presence of surface irregularities, caused by the indicia, which would impede travel of the stylus through the layer.

For a better understanding of the invention, reference is made to the following description of a representative embodiment of record receiving structures according to the invention and of a method for manufacturing such structures according to the invention, the description to be taken together with the accompanying drawings wherein.

*The record receiving structure*

Figures 1, 2, 3:
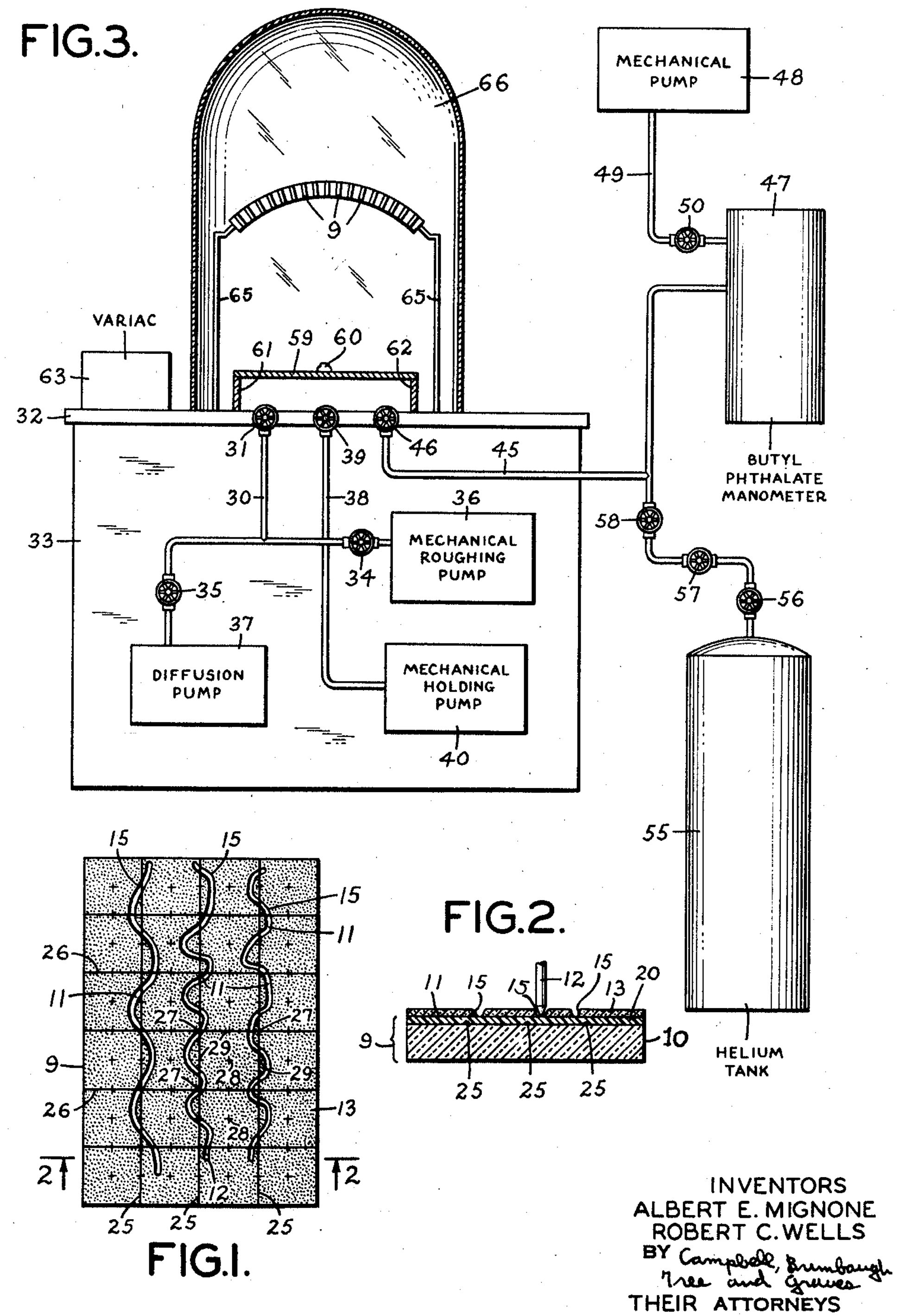
Fig. 1 is a plan view of an embodiment of a record receiving structure according to the invention.
Fig. 2 is a view in cross-section, taken as indicated by the arrows 2—2, of the embodiment of Fig. 1, the thickness dimension in Fig. 2 being exaggerated for the sake of clarity in the drawing.
Fig. 3 is a diagrammatic view of apparatus which is useful in the carrying out of a method of manufacture of the record receiving structure shown in Figs. 1 and 2.

Referring now to Figs. 1 and 2, the number 9 (Fig. 2) designates an underbody which includes a foundation member 10 and which, as shown, may also include a plastic coating 20 to be later described in more detail. The member 10 is a transparent rectangular glass plate which is of the same dimensions as the glass plates or slides used to mount specimens for viewing by optical microscopes. The upper surface 11 of the coating 20 is flat and smooth to provide a low coefficient of friction between the surface 11 and a stylus 12 whose tip rides on the surface 11 in the course of producing record traces 15 on the Fig. 2 structure. Each trace 15 is formed by stylus 12 in a record sustaining layer 13 seated on the substrate surface 11. The stylus produces the trace by dislodging the layer 13 ahead of it from the substrate surface 11 until debris from the layer accumulates in front of the stylus in an amount which causes the stylus to "skip" over the accumulated pile of debris. The stylus then renews its formation of the trace while the debris is left behind as a "speck".

While the layer 13 is, for convenience, shown in cross-section in Fig. 2 as a continous layer, the layer 13 is, in fact, composed of a great number of very small discrete silver particles represented by the stipples in Fig. 1. These silver particles may be deposited upon the surface 11 by the method hereafter described Considering now the characteristics of the silver particle layer 13, the layer has a dead black, mat appearance as a result of the fact that its particles produce multiple internal reflections of incident light within the layer with consequent absorption in the layer of substantially all of incident light. The concentration per unit area of particles within layer 13 determines the optical density thereof, optical density being defined as the logarithm of opacity, and opacity being defined as the ratio $I_0/I$ where $I_0$ equals intensity of radiation entering a layer of some medium and I equals intensity reaching the opposite surface. Optical density values given hereafter represent values determined by a Kodak Densitometer. By increasing the concentration of particles per unit area, it is correspondingly possible to increase the optical density of the layer. It has been found, however, that the optical density of layer 13 should preferably have an optical density of not less than 0.3, since below this density value the contrast between the trace and the layer does not give as good visibility of the trace as is desirable. Also, the optical density of layer 13 preferably has a value of not more than 1.2, since above this last-named value the trace of the stylus becomes wider than may be desirable, and the increased rate of "skipping" of the stylus renders the trace more discontinuous than may be desirable. Within this range including and extending between the values 0.3 and 1.2, it has been found that the optimum range includes and extends between the optical density values 0.6 and 0.9.

The size of the particles in layer 13 must be so related to the width of trace produced in the layer that the disruption of particles from surface 11 by the stylus will not produce a jagged or uneven appearance of the trace. The degree of unevenness of trace which can be tolerated is, of course, subject to some variation in dependence on what is demanded in the way of accuracy and convenience in reading the trace. It has been found desirable, however, for the intended application of record receiving structures according to the present invention, that the particles in layer 13 have diameters whose statistical distribution of values among all the particles has a mean value which does not exceed 1 micron.

Fig. 1 shows a number of traces 15 formed in layer 13 by movement of a stylus 12 through the layer while riding on the surface 11. Using a very sharp tipped stylus to form a trace it has been found that the characteristics of the silver particle layer 13 permit the width of traces 15 to be reduced to values of 20 and 5 microns at, respectively, optical density values of 0.9 and 0.3. By way of contrast, in a carbon black layer the widths of traces produced by the same stylus cannot be reduced below 40 and 10 microns at these same optical densities.

The 2 for 1 reduction in trace width afforded by the silver particle layer can be attributed to the probable fact that, although the silver particles have low adherence to the substrate surface 11, the adherence force of these particles to the substrate is greater than the coherence force between particles. Since the force of adherence dominates the force of coherence, the silver particles may be scraped off surface 11 by the stylus 12 without any accompanying substantial dislodgment of particles to the side of the stylus path. In a carbon black layer on the other hand, a substantial lateral dislodgement of particles does take place, apparently because of the dominance of the force of coherence between carbon black particles over the force of adherence of the particles to the substrate surface.

To summarize the advantages of the silver particle layer, for a given degree of visibility of the trace provided by a given optical density of the layer, the width of the trace can be reduced substantially below that which is the minimal value of trace width at the same optical density for the carbon black layer. Conversely, for a minimal trace width which has the same value for both types of layer, the silver particles give a substantially greater value of optical density to their layer than the optical density characterizing the carbon black layer to thereby substantially improve visibility of the trace in the silver layer as compared to the carbon black layer. Moreover, at minimum tolerable visibility, the silver particle layer is adapted to produce a trace of less width than the carbon black layer.

In the described embodiment the substrate surface 11 is, as stated, underlain by a plastic layer 20 which is painted, dipped or otherwise deposited on the surface of glass plate 10. Suitable plastic layers 20 have been formed, for example, of cellulose nitrate, cellulose acetate, polystyrene, Saran and cellophane. In the described embodiment the coating 20 is of cellulose acetate.

As taught in the aforementioned Vonnegut application, the use of a plastic layer to provide a substrate surface for the record sustaining layer is advantageous in at least two ways. First, the plastic layer surface 11 presents substantially less friction to the stylus 12 riding on the surface than would the surface of the glass plate 10. Thus, the drag force $f_s$ on the stylus is reduced to permit substantial reduction in the force F required to deflect the stylus to full scale deflection. Since, as stated, the energy output required of the stylus driving instrument to give full scale stylus deflection is ½ FD (where D is the distance traveled by the stylus to full scale deflection), and since the value D can, for reasons stated, be considerably reduced by using the described metal particle layer rather than a carbon black layer, the plastic layer 20 and the metal particle layer 13 cooperate to permit a record to be formed by a stylus driving instrument which provides only very low output energy.

Second, the plastic layer 20 may be used to "fix" the layer 13 after a trace has been formed thereon so as to prevent smudging of the trace by later handling. This may be done by softening the normally hard plastic layer 20 so that the particles in layer 13 become partially embedded in layer 20, and by then letting layer 20 reharden. Such selective softening and subsequent rehardening of layer 20 can be produced by treating the record receiving structure in an appropriate manner. For example, if layer 20 is composed of cellulose acetate, the record receiving structure may be exposed to the vapor of acetone which is a solvent of cellulose acetate. Upon such exposure, the cellulose acetate layer will become softened. Rehardening of the layer is attained by terminating exposure of the structure to the acetone vapor, and by causing evaporation to take place of the acetone which has become dissolved in the cellulose acetate during the exposure.

As shown in Figs. 1 and 2 a grid for reading the traces 15 is provided by a plurality of indicia formed of opaque bodies of material deposited on the upper surface of the glass plate 10. As described hereinafter the grid may be produced photographically. The principal components of the grid are a number of parallel indicia lines 25 which serve as lines marking the respective zero deflection positions of the several traces 15, and a number of parallel indicia lines 26 which are at right angles to the lines 25 and which intersect the lines 25 at points 27. The points 27 on a given line 25 are separated by intervals representing unit time periods in the time base movement of the recording structure relative to the stylus 12. The lines 25 and 26 divide the surface of the structure into equal size squares. Each such square is subdivided into quadrants by a subsidiary indicium 28 at the center of the square and by subsidiary indicia 29 located on the lines 25 and 26 halfway between the intersection points 27.

The transparent coating 20, in addition to its already-described functions, serves as a protective coating for the indicia on the plate 10.

As one method of manufacture, the described embodiment may be manufactured as follows.

*Preparation of grid by photographic process*

The basic steps involved in producing the described grid by a photographic technique are those of coating the glass plate 10 with a photosensitive emulsion, producing a latent image of the desired grid on the emulsion by exposing the emulsion to radiation which has passed through a master grid, and coverting the latent image so obtained into a finished grid image by the usual photographic steps of developing, washing and fixing the emulsion.

As stated, it is desirable that the indicia of the grid be small in size and yet sharp in detail. In order to obtain a grid having such indicia, it has been found desirable to coat the plate 10 with a photosensitive emulsion characterized by high resolution, as, say, a resolution of 500 lines per millimeter or better. An emulsion providing such high resolution can be obtained by preparing the emulsion according to the following formula.

| | | |
|---|---|---|
| Water | milliliters | 390 |
| Hard gelatin | grams | 20 |
| Silver nitrate | do | 4.00 |
| Potassium iodide | do | 0.13 |
| Potassium bromide | do | 3.10 |

The hard gelatin is dissolved in the water, filtered and divided into two portions of approximately 80 milliliters and 320 milliliters. Working under a safe light, the silver nitrate is dissolved in the smaller quantity of gelatin and held at 43° C. The halides are dissolved in the remainder of the gelatin and at 43° C. are added with constant, but not vigorous stirring, to the silver solution over a period of three to four minutes. The emulsion is stirred for an additional 3 minutes, cooled, set, shredded and washed in the usual manner. During the setting period, the emulsion gels, becoming quite solid. The shredding operation consists of cutting this gelled emulsion into small strips. During the washing operation unused salts and reaction products are removed from the shredded strips as they are rinsed in the water. The emulsion is then remelted and suitable finishing agents are added. These finishing agents consist of approximately 10 cc. of methyl or ethyl alcohol to increase flow; 5 cc. of 5% solution of Saponin, a photographically inert wetting agent which limits foaming and again increases flow; 1 cc. of a 5% solution of phenol in methyl or ethyl alcohol which prevents bacterial growth; and 1 ml. of a 5% solution of chrome alum in water which acts as a tanning agent to increase hardness of the emulsion surface after setting. 400 grams of such an emulsion should coat a surface of over 8 sq. ft. or about 700 plates 10.

To apply the emulsion so prepared to a plate 10, a simple hand coating technique may be used in which 0.9 of a milliliter of the above emulsion at 40° C. is metered onto the flat glass plate 10 and doctored evenly over its surface. The coated plate is next slid onto a perfectly flat and level chill plate. After the gelatin has set, the plate is placed in a rack and dried by circulating dehumidified air at a maximum temperature of 30° C. in the initial stages and 40° C. in the final stages. The thickness of this emulsion coating may desirably be .0008″. The thickness of the coating may be adjusted by varying the viscosity of the coating emulsion. This may be done by adding a small amount of water after the remelting operation.

After the emulsion has dried on the plate 10, a latent image of a grid is produced on the emulsion by exposing the emulsion to light which reaches the emulsion by passing through a master grid to project the pattern of the master grid onto the emulsion. Since a high resolution emulsion of the sort described is inherently slower in response to light than standard commercial emulsions, it is desirable, in producing the latent grid image, to speed up the exposure by using a high contrast master grid and a light source which is brighter than usual. After the desired degree of exposure of the emulsion has been obtained, the latent grid image is converted into a finished grid by immersing the coated plate for 1½ minutes in D–19 Developer, rinsing the plate in a stop bath of water for a few seconds, and fixing the image left on the plate by immersing the plate in a standard hypo solution for approximately 15 minutes. The record plate is then put on a rack and dried by circulated air from which dust particles have been filtered.

*Preparation of the fixing coating*

After the photographic grid has been processed, dried, and inspected, the slide is ready for the fixing coating (i.e. the plastic coating 20 which fixes the particles of the record sustaining layer after the trace or traces have been formed therein). The formula of the coating mixture is as follows:

| | | |
|---|---|---|
| Cellulose acetate (low viscosity) | grams | 5.0 |
| Plasticizer (methyl phthalyl ethyl glycolate) | do | 1.5 |
| Acetone | cc | 46.8 |
| Ethyl acetate | cc | 8.3 |
| Methyl Cellosolve acetate | cc | 3.9 |
| Ethyl lactate | cc | 8.3 |
| 1-nitropropanol | cc | 6.8 |
| n-Butanol | cc | 1.4 |
| Toluene | cc | 13.3 |

The 10 grams of cellulose acetate and plasticizer are added to the solvent mixture and stirred until it goes into solution. The viscosity of the coating mixture should be approximately 25 centipoises. The coating 20 may be applied to the plate 10 with a small brush, in which case only the center of the plate is coated, and the edges remain clean. Alternatively, the plate 10 may be dip coated or spray coated. The thickness of the fixing coating may be 1⁄10 of a mil. The surface of the plate, after drying, should be perfectly smooth and flat.

*Preparation of the record sustaining layer*

In this part of the manufacture a metal (as, say, silver), whose particles form the record sustaining layer, is introduced in vaporized form into an atmosphere which may be inert in the sense that it is not chemically active with the metal being deposited or with the record receiving structure. Helium may be used to provide such inert atmosphere. It has been found, however, that an inert atmosphere is not a necessity, and that in lieu thereof an atmosphere of air may also be used in many instances. In order to produce metal particles of the size desired, the atmosphere is maintained at a pressure which is a vacuum pressure but which is substantially above zero (absolute vacuum) pressure. Thus, as a working example, the pressure of the helium atmosphere may be four millimeters Hg when silver is being deposited.

As the metal is vaporized into the atmosphere, the underbodies to be coated with a particle layer of the metal are exposed in the atmosphere to the vaporized metal. Under these circumstances it has been found that the vaporized metal may be caused to condense in the form of the desired particle layer of the present invention rather than in the form of a "mirror" layer or some other kind of layer having undesired characteristics.

As a tentative explanation of why the described method produces the desired particle layer of mat appearance rather than a "mirror" layer, the mean free path in the inert atmosphere of the vaporized silver molecules is a function of the pressure of the atmosphere. At very low pressures as, say, pressures below 0.2 mm. for helium, the mean free path of the silver molecules is so great that the molecules do not have an opportunity to agglomerate with each other in the atmosphere before being deposited on the substrate surface of the underbody. Thus, these very low pressure conditions will result in the production of the undesired "mirror" layer on the underbody.

As the pressure at which vaporization takes place increases, the mean free path decreases. At a higher pressure as, say, 4 millimeters Hg for helium, the vaporized silver molecules collide with the molecules of the surrounding gas and with themselves. Agglomerates of silver are formed within the atmosphere, and these agglomerates deposit randomly upon the substrate surface as the mat appearing small size particles which are desired for the record sustaining layer.

It has been found that, as the pressure of the atmosphere increases, there is a desirable lessening of the force which is required of the stylus to remove particles from the substrate, and which is in the nature of a drag force on the stylus. Such lessening of the mentioned stylus force is explicable as due to a lessening of the adhesive force of the particles to the substrate surface, this adhesive force being considered herein as measurable in terms of the mentioned stylus force.

As the pressure increases, however, the deposition of particles on the substrate surface becomes less and less uniform. Clouds of silver agglomerates fill the inert atmosphere, and it becomes extremely difficult to obtain a particle layer which is uniform in optical density. Moreover, if the increase in pressure is carried too far, the stylus will rip and tear the record sustaining layer to cut a jagged trace therein rather than cutting an even trace therein. The cutting of such jagged trace is explicable as due to a situation where the coherence force between particles exceeds the adherence force of the particles to the substrate. Such situation where the coherence force exceeds the adherence force is considered herein to be present when it is observed that the stylus does, in fact, tear the record sustaining layer to cut a jagged trace.

It follows from the foregoing discussion that the pressure of atmosphere best suited for the practice of the presently-described method is a pressure which provides a reasonable compromise among the factors of low adhesion of particles to the substrate surface, and uniformity of deposit of the particle layer, while avoiding the condition where the coherence between particles exceeds the adherence of the particles to the substrate. The optimum pressure range for obtaining such comprise has been found for helium to be the range which includes and extends between the pressure values 2 mm. Hg and 6 mm. Hg when silver is being deposited.

In the practice of the described method it has been found that the characteristics of the particle layer deposited on the underbody are affected to some extent by the distance by which the underbody, during condensation of the layer, is spaced from the source of the vaporized metal. While this distance is not critical, it has been found that unsatisfactory results are obtained if the underbody is either too close to or too far from the said source during deposition. If the underbody is too close, the temperature of the substrate surface is raised by the heat which is used at the source to vaporize the metal, and it appears that this rise in temperature will cause a slight but undesirable increase in the adhesive force which binds the particles to the substrate surface. Also, random sputtering of hot metal from the source may reach the substrate surface, and impurities in the metal may more easily reach the surface. If, on the other hand, the substrate surface is too far from the vaporized silver source, too few of the silver agglomerates in the inert atmosphere reach the substrate surface, and the uniformity of deposition of particles on the surface cannot be readily controlled. In general, it has been found that the optimum spacing of the underbody from the vaporized metal source is obtained when the underbody is spaced in the range between 5 and 15 inches from the source.

Rate of deposition is another factor which must be taken into consideration in the practice of the presently-described method. Best results have been obtained by depositing the particle layer on the underbody at a rapid enough rate that the layer reaches its desired optical density in a matter of, say, two seconds. This rapid deposition of the particle layer can be obtained by "flash" heating the source of vaporized metal to quickly raise this source to a temperature at which rapid vaporization takes place, and by maintaining the source at this high temperature for the short period of time required to complete deposition.

Particle layers obtained by rapid deposition are preferable to layers obtained by slow deposition for the reason that the latter layers are more subject to lateral tearing by the marking stylus, and the same stylus will hence produce a wider trace in the latter layers than in the former layers. The difference between the trace widths which are obtained in the two layers may be due to the fact that a metallic layer formed by rapid evaporation consists of small crystallites whereas a layer deposited by slow evaporation shows a much larger amorphous area (Vacuum, vol. II, No. 4, October 1952, p. 371).

An interrlation exists between each of the variables discussed above. As the pressure of the inert atmosphere becomes greater, the mean free paths of the silver molecules become less. As the distance of the source of vaporized metal from the substrate surface increases, silver molecules, having a greater distance to travel, collide and agglomerate more. As the rate of deposition is increased, the silver molecules have less of a tendency to condense amorphously rather than, as is desired, in the form of discrete particles. In this connection it is of particular interest to note the interrelation between pressure and rate of deposition in respect to the adherence and coherence properties of the particles which are deposited. As stated, pressure values are selected with the end in view of producing a low adhesive force between the particles and substrate so that a minimal force exerted by the stylus will dislodge the particles from the substrate. The value to which the adherence can be lowered depends, however, on the coherence force between particles, since if the coherence force is allowed to exceed the adherence force, the stylus will rip and tear the record sustaining layer, and an unsatisfactory trace will result. If a very slow rate of deposition is used the coherence force between particles will be so high that the coherence force between particles will exceed the adherence force of the particles to the substrate for any value of the latter force which would permit the particles to be easily dislodged from the substrate by the stylus. If, however, a rapid rate of deposition is employed, the coherence force between particles will be low enough to permit the adherence force of the particles to the substrate to be lowered to the point where the adherence force still exceeds the coherence force to thereby preclude ripping and tearing by the stylus, but where the adherence force is slight enough to permit easy dislodgment of the particles from the substrate by the stylus. Of course, one mode of obtaining such rapid deposition is by the use of "flash" heating as heretofore described.

Fig. 3 is a schematic diagram of apparatus useful in carrying out the method described above. As shown in Fig. 3, a vacuum line 30 may be rendered open at one end through a valve 31 to a fluid region above a base plate 32 on a table 33. Line 30 is connected at its other end through valves 34 and 35 to, respectively, a mechanical roughing pump 36 and a diffusion pump 37. In like manner, a second vacuum line 38 may be rendered open at one end through the valve 39 to the said fluid region, and is connected at its other end to a mechanical holding pump 40. In like manner, a third vacuum line 45 may be rendered open at one end through the valve 46 to the said fluid region. The other end of line 45 is connected to a butyl phthalate manometer 47 which is evacuated by a mechanical pump 48 connected to the manometer through a line 49 and a shut-off valve 50. The line 45 also acts as a conduit for the atmosphere gas which in the present instance is helium and which may be selectively fed from a tank 55 through a shut-off valve 56, a reducing valve 57, a needle valve 58, line 45, and valve 46 into the mentioned fluid region above base plate 32.

Mounted above the base plate 32 over the valves 31, 39, 46 is a tungsten plate 59 adapted to support on its upper surface a small metal body 60 which, when heated, acts as the source of vaporized metal. To the end of heating body 60, opposite sides of the tungsten plate 59 are attached to the upstanding electroconductive side plates 61, 62 which support plate 59 above base plate 32, and which also act as electrodes to pass current through the tungsten plate. The electrodes 61, 62 are connected to a source of electric power (not shown) through a Variac 63 which, in accordance with its adjustment, can vary the current passing through tungsten plate 59 from zero value to a high value.

The electrodes 61, 62 are straddled by a frame 65 which is adapted to support above the body 60 a plurality of underbodies 9 upon which particle layers 13 are to be deposited. As shown in Fig. 3, the underbodies 9 are supported by frame 65 so that the underbodies are disposed to present at a low angle of incidence to the source 60 of vaporized metal the surface upon which the particle layer is to be deposited. A removable bell jar 66 is shown in Fig. 3 seated in a position to enclose the frame 65, plate 59 and the fluid region with which valves 31, 39 and 46 communicate. A vacuum-tight seal may be produced in a conventional manner between the bottom periphery of the bell jar and the surface of base plate 32 on which the bell jar rests.

The apparatus of Fig. 3 is operated in the following manner. The bell jar is wholly or partially removed, and the underbodies 9 to be coated with a particle layer are loaded onto the frame 65. At the same time a body 60 of metal to be vaporized is deposited on plate 59. The bell jar is then returned to the position shown in Fig. 4, and a vacuum seal is produced between the base of the bell jar and the surface of base plate 32.

After the bell jar is seated and made vacuum tight, the region within the bell jar is evacuated to a pressure of approximately 0.1 of a micron of mercury by the pumps 36, 37, 40. Helium from tank 55 is then introduced into the bell jar until the pressure therein rises to a desired value as, say, 4 millimeters of mercury. When the desired pressure level has been reached, the Variac 63 is changed substantially instantaneously from a zero current setting to a high current setting. This high current setting produces a surge of current through tungsten plate 59 to flash heat the plate 59 and body 60 to a very high temperature. At this temperature the metal in body 60 rapidly vaporizes into the helium atmosphere in bell jar 66 to be deposited, as already described, as a particle layer on underbodies 9. The Variac 63 is maintained at this high current setting for a period, as, say, two seconds, which is sufficient to vaporize all of the metal in body 60. At the end of the period the Variac is changed back to zero current setting. Within this period, a particle layer of proper optical density and uniformity will have been deposited on the underbodies 9. The amount of metal deposited on underbodies 9 may be controlled to some extent by varying the mass of body 60 and the period of flash heating.

After the current through plate 59 has been terminated, the vacuum within bell jar 66 is relieved, the bell jar is removed, and the underbodies 9 are taken off the frame 65. Thereafter, the underbodies are rubbed with a soft, lintless cloth to remove adhering metal particles from the back and side surfaces of the underbody, but to leave intact a particle layer 13 upon the front surface of the underbodies.

It should be noted that the described vacuum operations do not adversely affect the properties of either the photographically-produced grid or the plastic coating, and that the stability of these elements in the course of the vacuum operations represents a distinct advantage of these elements when the same are to be used in a record receiver whose record sustaning layer is prepared in the manner described. Also, all of the elements of a record receiving structure produced as described are compatible with each other and will not change color or otherwise deteriorate upon long standing.

While the preparation of the record sustaining layer has been described in terms of the deposition of silver in a helium atmosphere, it will be understood that the layer may be prepared in other ways as well. For example, a satisfactory layer may be prepared by flash heating silver into an air atmosphere within the pressure range extending between and including 1–2 mm. Hg. Also, a satisfactory layer may be prepared by flash heating copper into an air atmosphere at 2 mm. Hg. It would appear from experiments conducted in connection with the last-named layer preparations that, when the same kind of metal is vaporized into, respectively, an air atmosphere and a helium atmosphere, the air atmosphere differs from the helium atmosphere in respect to the lower pressure value at which a mirror layer starts to be formed and in respect to the upper pressure value at which the layer becomes susceptible to ripping or tearing by the stylus. Also, it appears that when different kinds of metals are vaporized into the same atmospheres the values of the mentioned lower and upper atmosphere pressures will vary somewhat from metal to metal. Thus, as a general observation, it appears that both the lower pressure at which a mirror layer starts to be formed and the upper pressure at which the layer tends to tear will vary somewhat in value when the same kind of metal is vaporized into atmospheres of different composition, or when different metals are vaporized into atmospheres of the same composition.

The above-described embodiments being exemplary only, it will be appreciated that the invention herein comprehends embodiments differing in form and/or detail from the above-described embodiments. For example, although the method described above produces finished record receiving structures in batches, it is within the scope of the invention to produce record receiving structures by a continuous method. Further, the plastic coating or described indicia, or both, may be omitted from record receiving structures having a metal particle record sustaining layer according to the present invention. Further, the plastic coating may be omitted, or the record sustaining layer may be formed of other than metal particles, or both changes may be made in a record receiving structure having indicia according to the present invention. Hence, it will be understood that the invention herein is not to be considered as limited save as is consonant with the scope of the following claims.

We claim:

1. A structure adapted to provide a record of movement of a mechanical stylus, said structure comprising, an underbody, and a record sustaining layer, of an optical density in the range between and including the values 0.3 and 1.2, carried by said underbody and comprised of fine, discrete particles of metal which have a mat appearance in said layer and which are characterized by a lesser coherence among particles than adherence of said particles to their substrate to permit the stylus to form a fair edged trace in said layer as a visible record of said movement.

2. A structure adapted to provide a record of movement of a mechanical stylus, said structure comprising, an underbody, and a record sustaining layer, of an optical density in the range between and including the values 0.6 and 0.9, carried by said underbody and comprised of fine, discrete particles of metal which have a mat appearance in said layer and which are characterized by a lesser coherence among particles than adherence of said particles to their substrate to permit the stylus to form a fair edged trace in said layer as a visible record of said movement.

3. A structure adapted to provide a record of movement of a mechanical stylus, said structure comprising, an underbody, and a record sustaining layer, of an optical density in the range between and including the values 0.3 and 1.2, carried by said underbody and comprised of fine, discrete particles of metal which have a mat appearance in said layer and which are characterized by a lesser coherence among particles than adherence of said particles to their substrate to permit the stylus to form a fair edged trace in said layer as a visible record of said movement, said particles being adapted at an optical layer density of 0.3 to provide a stylus trace of less than 10 microns width.

4. A structure adapted to provide a record of movement of a mechanical stylus, said structure comprising, an underbody, and a layer of fine, discrete particles of metal having a mat appearance in said layer and having diameters statistically distributed in value among said particles to have a mean diameter value of less than one micron, said particles being deposited on said underbody and being characterized by a lesser coherence among particles than adherence of said particles to their substrate to permit the stylus to form a fair edged trace in said layer as a visible record of said movement.

5. A structure adapted to provide a record of movement of a mechanical stylus, said structure comprising, an underbody, and a record sustaining layer, of an optical density in the range between and including the values 0.3 and 1.2, carried by said underbody and comprised of fine, discrete particles of metal having a mat appearance in said layer and deposited on said underbody, said particles being characterized by a lesser coherence among particles than adherence of said particles to their substrate to permit the stylus to form a fair edged trace in said layer as a visible record of said movement, the diameters of said particles being statistically distributed in value among said particles to have a mean diameter value which is less than one micron.

6. A structure adapted to provide a record of movement of a mechanical stylus, said structure comprising, an underbody, and a record sustaining layer, of an optical density in the range between and including the values 0.6 and 0.9, carried by said underbody and comprised of fine, discrete particles of metal having a mat appearance in said layer and deposited on said underbody, said particles being characterized by a lesser coherence among particles than adherence of said particles to their substrate to permit the stylus to form a fair edged trace in said layer as a visible record of said movement, the diameters of said particles being statistically distributed in value among said particles to have a mean diameter value which is less than one micron.

7. A method of producing a structure adapted to provide a record of movement of a mechanical stylus comprising, evacuating a fluid-enclosing space down to a pressure close to absolute vacuum, introducing into said space a sufficient amount of a gaseous atmosphere to raise the pressure of said space to a value between lower and upper values therefor, flash heating a body of metal in said space to vaporize said metal into said gaseous atmosphere, exposing an underbody in said space to said vaporized metal in said gaseous atmosphere to produce condensation on said underbody of a layer of finely divided, discrete metal particles having a mat appearance in said layer and having diameters which are statistically distributed among said particles to have a mean diameter of less than one micron, and controlling the conditions of condensation to render said layer of substantially uniform optical density and of an optical density value in the range between and including the values 0.6 and 0.9, said lower pressure value being the value at which a mirror layer is formed, and said upper pressure value being the value at which the formed layer is rendered tearable by the stylus.

8. A structure adapted to provide a record of movement of a mechanical stylus, said structure comprising, a transparent underbody, and a record sustaining layer of an optical density in the range between and including the values 0.6 and 0.9, carried by said underbody and comprised of fine, discrete particles of metal having a mat appearance in said layer and deposited on said underbody, said particles being characterized by a lesser coherence among particles than adherence of said particles to their substrate to permit the stylus to form a fair edged trace in said layer as a visible record of said movement, the diameters of said particles being statistically distributed in value among said particles to have a mean diameter value which is less than one micron.

9. A structure adapted to provide a record of movement of a mechanical stylus, said structure comprising, a transparent foundation member, a transparent, normally hard, selectively softenable and rehardenable, plastic coating on said member, and a record sustaining layer of an optical density in the range between and including the values 0.6 and 0.9, carried by said coating and comprised of fine, discrete particles of metal having a mat appearance in said layer and deposited on said underbody, said particles being characterized by a lesser coherence among particles than adherence of said particles to their substrate to permit the stylus to form a fair edged trace in said layer as a visible record of said movement, the diameters of said particles being statistically distributed in value among said particles to have a mean diameter value which is less than one micron, said particles being adapted to become firmly imbedded in said plastic coating upon softening and subsequent rehardening thereof.

10. A structure adapted to provide a record of movement of a mechanical stylus, said structure comprising, a glassy, impermeable, transparent foundation member, a developed and fixed photographic emulsion in the form of a coating on said member and providing a visible photographic image of at least one indicium marking a dimensional value in a dimension of said member by a width in said dimension, a protective light pervious coating covering said photographic emulsion coating and providing a bearing surface for said stylus, and a record sustaining layer carried by said member and adapted when moved through by said stylus to provide a visible trace of said movement, said layer and photographic emulsion coating being relatively disposed in the relation of underlay and overlay and said layer being in visibly superposed relation with said photographic emulsion coating to permit said trace to be visually read with reference to said indicium, the said width of said indicium being less than the width of the minimum width trace inscribable in said layer.

11. A structure adapted to provide a record of movement of a mechanical stylus, said structure comprising, a glassy, impermeable, transparent foundation member, a developed and fixed photographic emulsion in the form of a coating on said member and providing a visible photographic image of a reference grid consisting of a plurality of indicia each marking a dimensional value in a dimension of said member by a width in said dimension, a protective light-pervious coating covering said photographic emulsion coating and providing a bearing surface for said stylus, and a record sustaining layer deposited on said protective coating and locally removable therefrom by said stylus to provide a visible trace of said movement, said layer being partially light transmissive to expose said grid to view through said layer, the said width of each of said indicia being less than the width of the minimum width trace inscribable in said layer.

12. A structure adapted to provide a record of movement of a mechanical stylus, said structure comprising, a foundation member, a body of material carried by said member and providing a visible photographic image of at least one indicium marking a dimensional value in a dimension of said member by a width in said dimension, and a record sustaining layer carried by said member and adapted when moved through by said stylus to provide a visible trace of said movement, said body and layer being relatively disposed in the relation of underlay and overlay and said layer being in visually superposed relation with said photographic image to permit said trace to be visually read with reference to said indicium, the said width of said indicium being less than the width of the minimum width trace inscribable in said layer, said layer having an optical density between 0.3 and 1.2 and being comprised of fine metallic discrete particles which have a mat appearance in said layer.

13. A structure adapted to provide a record of movement of a mechanical stylus, said structure comprising, a foundation member, a body of opaque material carried by said member and providing a visible photographic image in the form of a grid consisting of a plurality of indicia each marking a dimensional value in a dimension of said member, and a record sustaining layer carried by said member and adapted when moved through by said stylus to provide a visible trace of said movement, said body and layer being relatively disposed in the relation of underlay and overlay and said layer being in visually superposed relation with said photographic image to permit said trace to be visually read with reference to said indicia, the said width of each of said indicia being less than the width of the minimum width trace inscribable in said layer, said layer having an optical density in the range between and including the values 0.6 and 0.9, said layer being comprised of fine, discrete particles of metal which have a mat appearance in said layer and whose diameters are statistically distributed in value among said particles to have a mean diameter value which is less than one micron.

14. A structure adapted to provide a record of movement of a mechanical stylus, said structure comprising, a foundation member, a body of material carried by said member and providing a visible photographic image of at least one indicium marking a dimensional value in a dimension of said member by a width in said dimension, a protective light pervious plastic coating covering said body of opaque material, and a record sustaining layer deposited on said coating and locally removable therefrom by said stylus to provide a visible trace of said movement, the said width of said indicium being less than the width of the minimum width trace inscribable in said layer, said layer having an optical density in the range between and including the values 0.6 and 0.9, said layer being comprised of fine, discrete particles of metal which have a mat appearance in said layer and whose diameters are statistically distributed in value among said particles to have a mean diameter value which is less than one micron.

15. A structure adapted to provide a record of movement of a mechanical stylus, said structure comprising, a transparent foundation member, a body of opaque material carried by said member and providing a visible photographic image in the form of a grid consisting of a plurality of indicia each marking a dimensional value in a dimension of said member by a width in said dimension, a light-pervious selectively softenable and rehardenable coating of plastic material covering said body of opaque material and a record sustaining layer deposited on said coating and locally removable therefrom by said stylus to provide a visible trace of said movement, the said width of each of said indicia being less than the width of the minimum width trace inscribable in said layer, said layer having an optical density in the range between and including the values 0.6 and 0.9, said layer being comprised of fine, discrete particles of metal which have a mat appearance in said layer and whose diameters are statistically distributed in value among said particles to have a mean diameter value which is less than one micron.

References Cited in the file of this patent

UNITED STATES PATENTS

| | | |
|---|---|---|
| 748,918 | Bristol | Jan. 5, 1904 |
| 1,234,852 | Avram | July 31, 1917 |
| 1,621,749 | Quait | Mar. 22, 1927 |
| 2,143,723 | Walker et al. | Jan. 10, 1939 |
| 2,234,237 | Feist | Mar. 11, 1941 |
| 2,423,476 | Billings et al. | July 8, 1947 |
| 2,562,770 | Carter | July 31, 1951 |
| 2,665,229 | Schuler et al. | Jan. 5, 1954 |
| 2,687,361 | Traub | Aug. 24, 1954 |
| 2,833,677 | Baumlein | May 6, 1958 |

OTHER REFERENCES

Pfund I: Journal of Optical Society of America, volume 23, October 1933, pages 375–378. (Copy in Scientific Library.)

Pfund II: Review of Scientific Instruments, volume 1, July 1930, pages 397–399.